United States Patent
Chang et al.

(10) Patent No.: US 11,416,146 B1
(45) Date of Patent: Aug. 16, 2022

(54) MEMORY STRUCTURE WITH INPUT-AWARE MAXIMUM MULTIPLY-AND-ACCUMULATE VALUE ZONE PREDICTION FOR COMPUTING-IN-MEMORY APPLICATIONS AND OPERATING METHOD THEREOF

(71) Applicant: NATIONAL TSING HUA UNIVERSITY, Hsinchu (TW)

(72) Inventors: Meng-Fan Chang, Hsinchu (TW); Jian-Wei Su, Hsinchu (TW); Je-Min Hung, Hsinchu (TW); Chuan-Jia Jhang, Hsinchu (TW); Ping-Chun Wu, Hsinchu (TW); Jin-Sheng Ren, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 17/361,343

(22) Filed: Jun. 29, 2021

(51) Int. Cl.
*G06F 3/06* (2006.01)
*G06F 7/523* (2006.01)

(52) U.S. Cl.
CPC ............ *G06F 3/061* (2013.01); *G06F 3/0655* (2013.01); *G06F 3/0673* (2013.01); *G06F 7/523* (2013.01)

(58) Field of Classification Search
CPC ...... G06F 3/061; G06F 3/0655; G06F 3/0673; G06F 7/523
See application file for complete search history.

(56) References Cited

U.S. PATENT DOCUMENTS

| 11,048,434 B2 * | 6/2021 | Kumar | G11C 13/003 |
| 11,195,090 B1 * | 12/2021 | Chang | G11C 13/0028 |
| 11,335,401 B1 * | 5/2022 | Huang | G11C 13/0038 |

* cited by examiner

*Primary Examiner* — Zhuo H Li
(74) *Attorney, Agent, or Firm* — CKC & Partners Co., LLC

(57) ABSTRACT

A memory structure with input-aware maximum multiply-and-accumulate value zone prediction for computing-in-memory applications includes a memory array, an input-aware zone prediction circuit and an analog-to-digital converter. An input-aware maximum partial multiply-and-accumulate value voltage generator is configured to generate a maximum partial multiply-and-accumulate value according to at least one input value. A prediction-aware global reference voltage generator is configured to generate a plurality of global reference voltages, a maximum reference voltage and a selected minimum reference voltage. A maximum partial multiply-and-accumulate value zone detector is configured to generate a zone switch signal by comparing the maximum partial multiply-and-accumulate value and the global reference voltages. The analog-to-digital converter is configured to convert an analog multiply-and-accumulate output value of the memory array to a digital multiply-and-accumulate output value according to the maximum reference voltage, the selected minimum reference voltage and the zone switch signal.

20 Claims, 9 Drawing Sheets

MEMORY STRUCTURE WITH INPUT-AWARE MAXIMUM MULTIPLY-AND-ACCUMULATE VALUE ZONE PREDICTION FOR COMPUTING-IN-MEMORY APPLICATIONS AND OPERATING METHOD THEREOF

BACKGROUND

Technical Field

The present disclosure relates to a memory structure for computing-in-memory applications and an operating method thereof. More particularly, the present disclosure relates to a memory structure with input-aware maximum multiply-and-accumulate value zone prediction for computing-in-memory applications and an operating method thereof.

Description of Related Art

Computing-in-memory (CIM) is a promising solution that can reduce the power consumption of artificial intelligence (AI) chip multiply-and-accumulate (MAC) operations. In order to increase the bandwidth and reduce the power consumption of each operation, CIM may turn on multiple word lines (WL) in a memory array to compute at the same time. The computing results can accumulate on bit lines (BL) and read out by an analog-to-digital converter (ADC) which is one of the current development directions. However, the ADC is the mainly source of power consumption when computing MAC operation. The performance of ADC greatly affects the CIM macro performance. In addition, a conventional method of using a BL header to collect MAC values may reduce the margin of different MAC values, thus causing serious error when sensing the MAC values. Improving the performance of the ADC and enhancing sensing margin are two of the challenges to achieve low power consumption and high accuracy in CIM. Accordingly, a memory structure with input-aware maximum MAC value zone prediction for CIM applications and an operating method thereof having the features of adjusting the number of toggle phases and output bits of the ADC to reduce the power consumption and enhancing sensing margin are commercially desirable.

SUMMARY

According to one aspect of the present disclosure, a memory structure with input-aware maximum multiply-and-accumulate value zone prediction for computing-in-memory applications includes a memory array, an input-aware zone prediction circuit and an analog-to-digital converter. The memory array includes a plurality of memory units and an output bit line. Each of the memory units stores a weight. The input-aware zone prediction circuit is connected to the memory array and includes an input-aware maximum partial multiply-and-accumulate value voltage generator, a prediction-aware global reference voltage generator and a maximum partial multiply-and-accumulate value zone detector. The input-aware maximum partial multiply-and-accumulate value voltage generator is configured to generate a maximum partial multiply-and-accumulate value according to at least one input value. The prediction-aware global reference voltage generator is configured to generate a plurality of global reference voltages, a maximum reference voltage and a selected minimum reference voltage. The maximum partial multiply-and-accumulate value zone detector is connected to the input-aware maximum partial multiply-and-accumulate value voltage generator and the prediction-aware global reference voltage generator. The maximum partial multiply-and-accumulate value zone detector is configured to generate a zone switch signal by comparing the maximum partial multiply-and-accumulate value and the global reference voltages. The analog-to-digital converter is connected to the memory array and the prediction-aware global reference voltage generator. The memory array is configured to generate an analog multiply-and-accumulate output value on the output bit line according to the at least one input value multiplied by the weight, and the analog-to-digital converter is configured to convert the analog multiply-and-accumulate output value to a digital multiply-and-accumulate output value according to the maximum reference voltage, the selected minimum reference voltage and the zone switch signal.

According to another aspect of the present disclosure, an operating method of a memory structure with input-aware maximum multiply-and-accumulate value zone prediction for computing-in-memory applications includes performing a computing-in-memory operating step, a voltage generating step, a zone detecting step and a converter controlling step. The computing-in-memory operating step includes driving a memory array of the memory structure to generate an analog multiply-and-accumulate output value on an output bit line according to at least one input value multiplied by a weight. The voltage generating step includes driving an input-aware maximum partial multiply-and-accumulate value voltage generator of the memory structure to generate a maximum partial multiply-and-accumulate value according to the at least one input value, and driving a prediction-aware global reference voltage generator of the memory structure to generate a plurality of global reference voltages, a maximum reference voltage and a selected minimum reference voltage. The zone detecting step includes driving a maximum partial multiply-and-accumulate value zone detector of the memory structure to generate a zone switch signal by comparing the maximum partial multiply-and-accumulate value and the global reference voltages. The converter controlling step includes driving an analog-to-digital converter of the memory structure to convert the analog multiply-and-accumulate output value to a digital multiply-and-accumulate output value according to the maximum reference voltage, the selected minimum reference voltage and the zone switch signal.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Before describing any embodiments in detail, some terms used in the following are described. A voltage level of "1" represents that the voltage is equal to a power supply voltage $V_{DD}$. The voltage level of "0" represents that the voltage is equal to a ground voltage GND. A PMOS transistor and an NMOS transistor represent a P-type MOS transistor and an N-type MOS transistor, respectively. Each transistor has a source, a drain and a gate.

Figure 1:
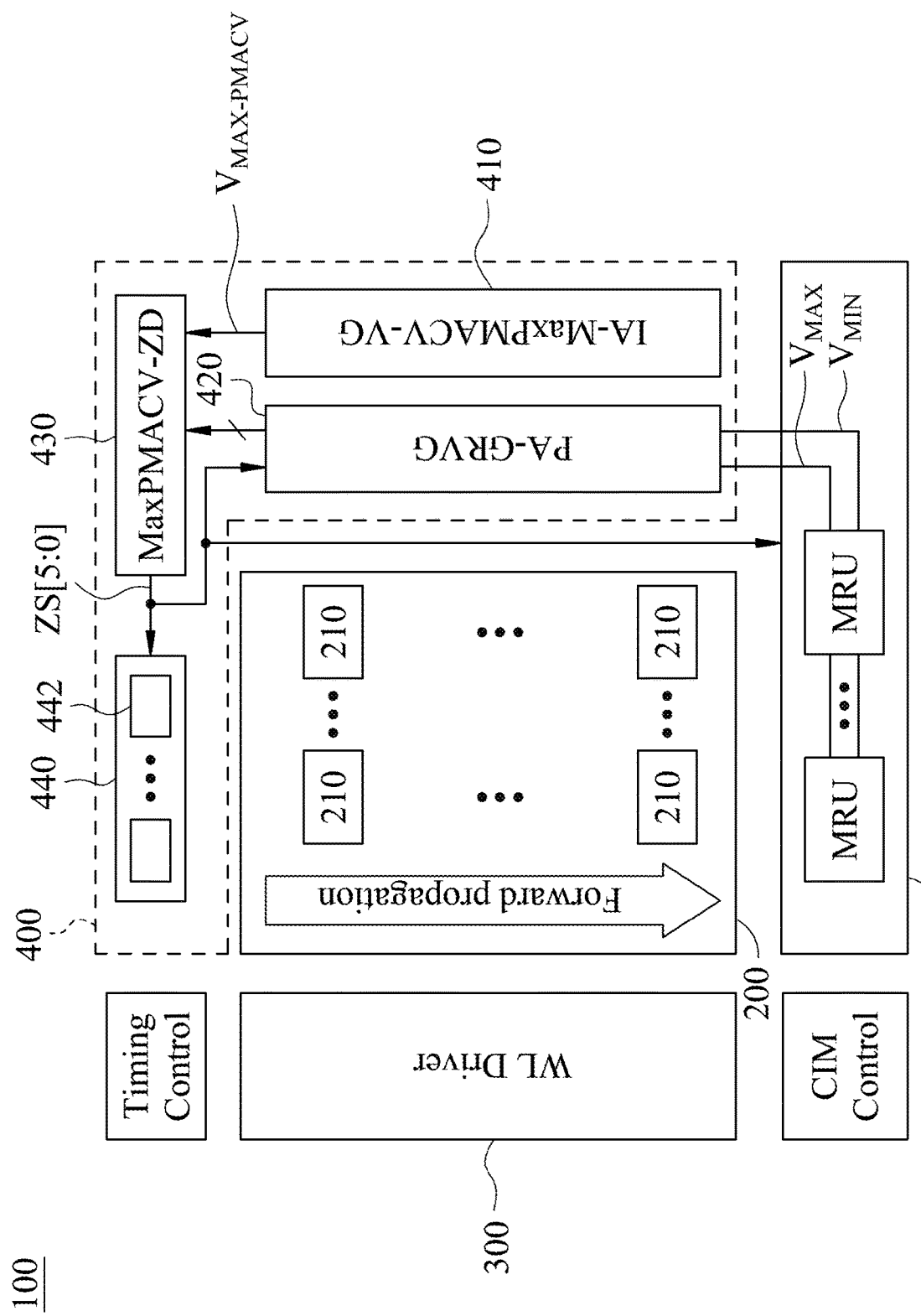
FIG. 1 shows a block diagram of a memory structure with input-aware maximum multiply-and-accumulate (MAC) value zone prediction (IA-MaxMACV-ZP) for computing-in-memory applications according to one embodiment of the present disclosure.
Figure 2:
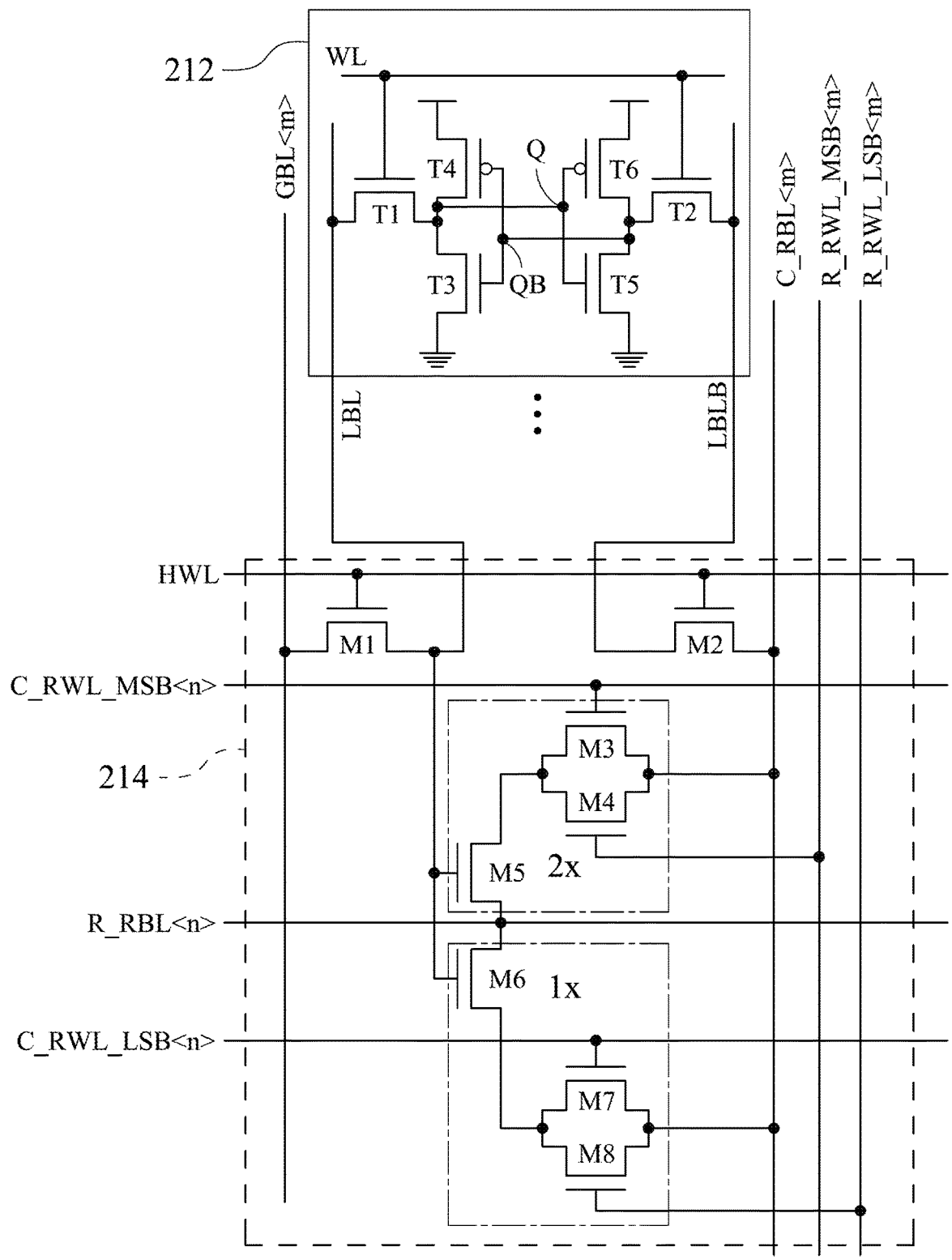
FIG. 2 shows a circuit diagram of a memory array of the memory structure of FIG. 1.
Figure 3:
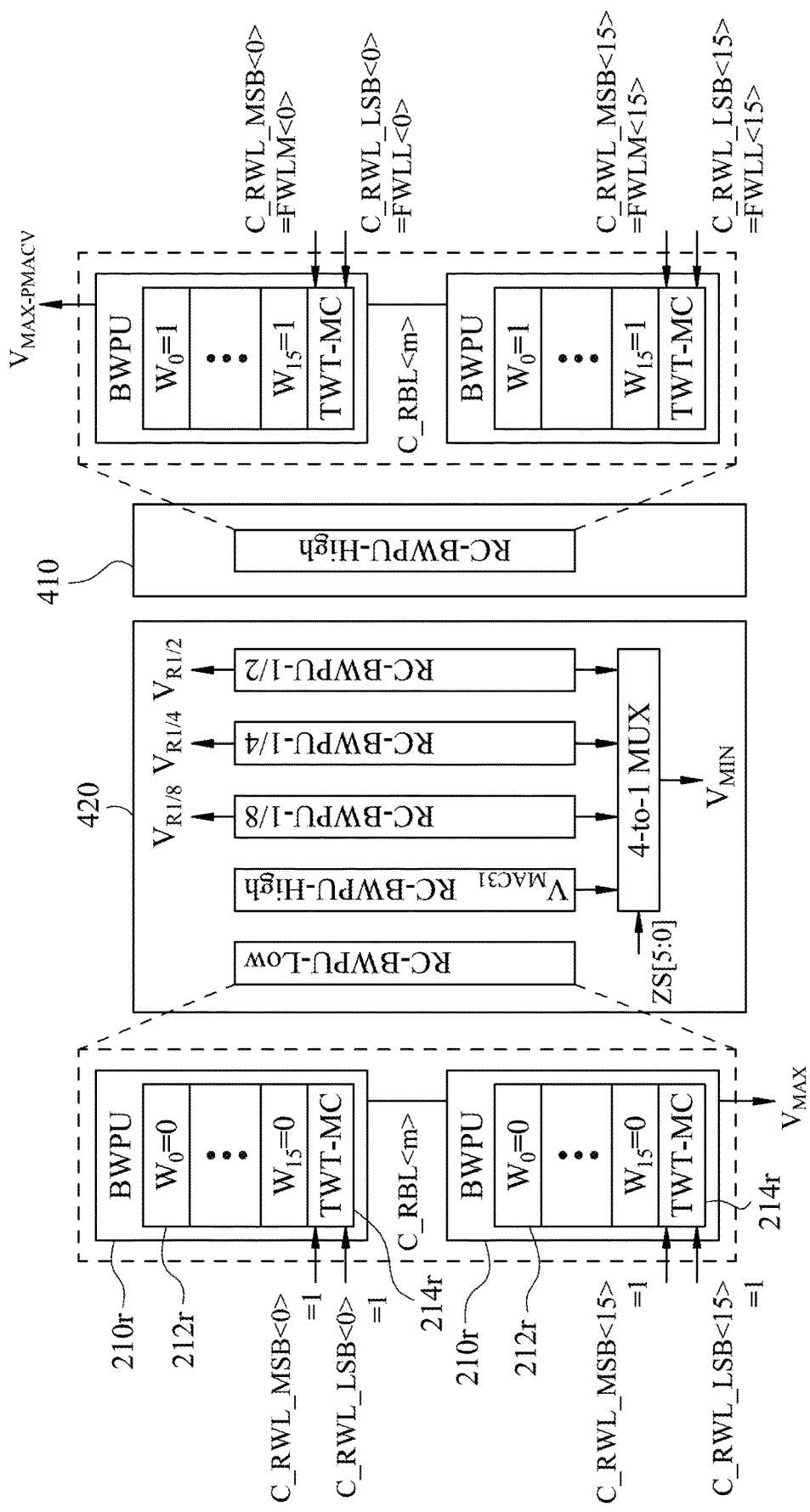
FIG. 3 shows a block diagram of an input-aware maximum partial multiply-and-accumulate value voltage generator (IA-MaxPMACV-VG) and a prediction-aware global reference voltage generator (PA-GRVG) of an input-aware zone prediction circuit of the memory structure of FIG. 1.
Figure 4:
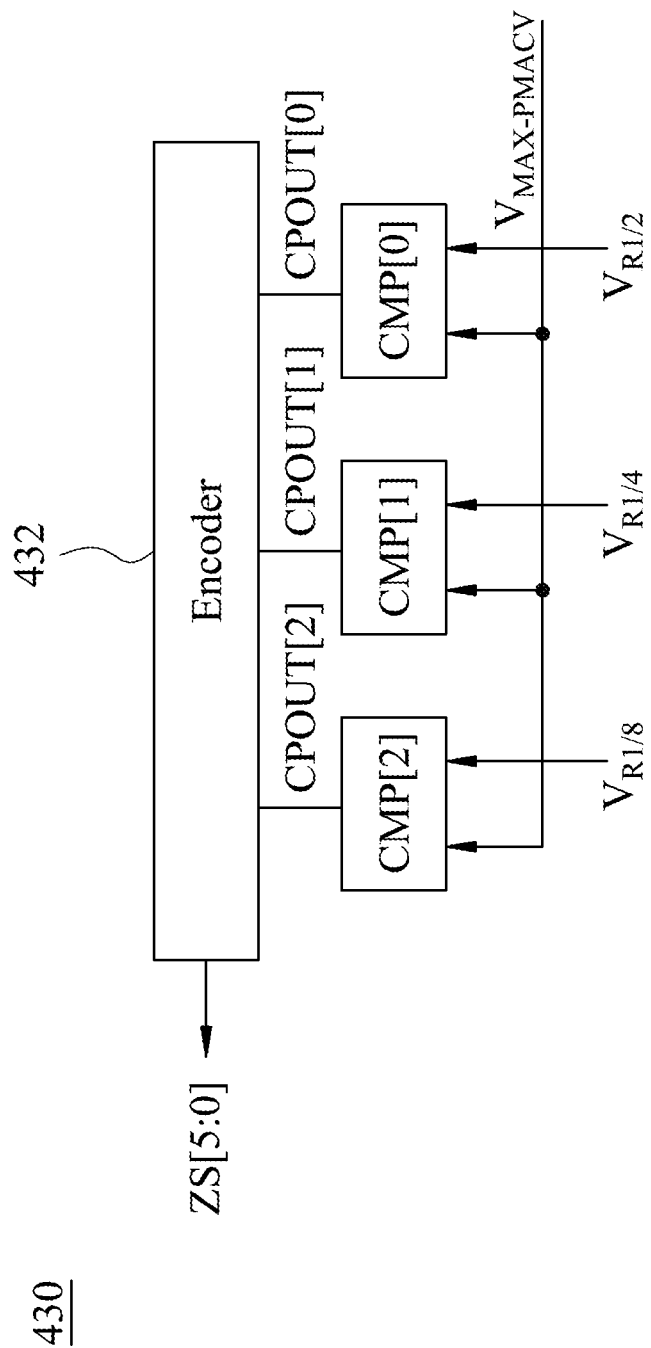
FIG. 4 shows a block diagram of a maximum partial multiply-and-accumulate value zone detector (MaxP-MACV-ZD) of the input-aware zone prediction circuit of the memory structure of FIG. 1.
Figure 5:
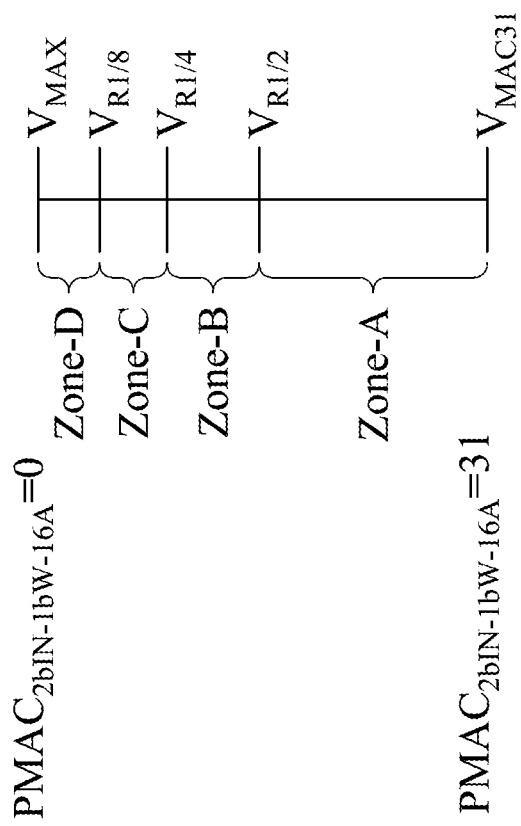
FIG. 5 shows a schematic view of a plurality of zones between a maximum reference voltage and a minimum reference voltage.
Figure 6:
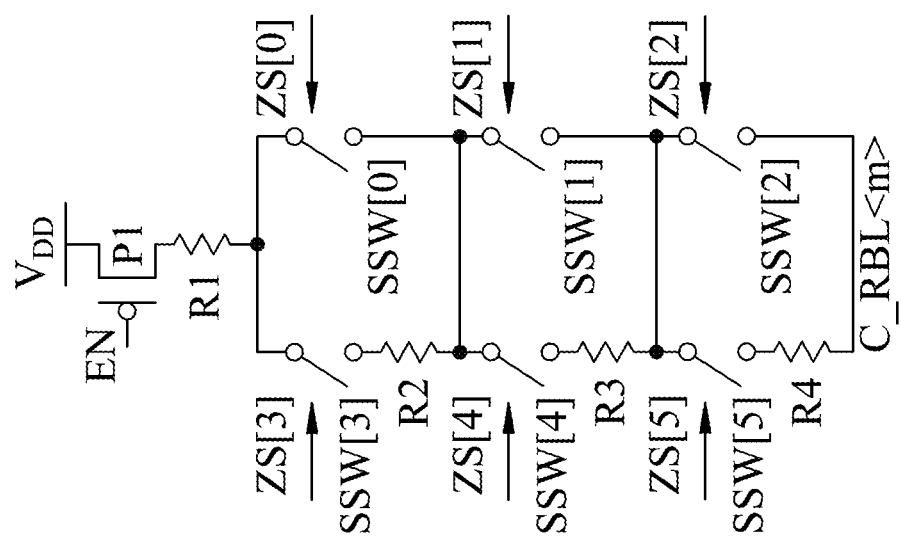
FIG. 6 shows a circuit diagram of a prediction-aware bitline header selector (PA-BLHS) of a bit line header of the input-aware zone prediction circuit of the memory structure of FIG. 1.
Figure 7:
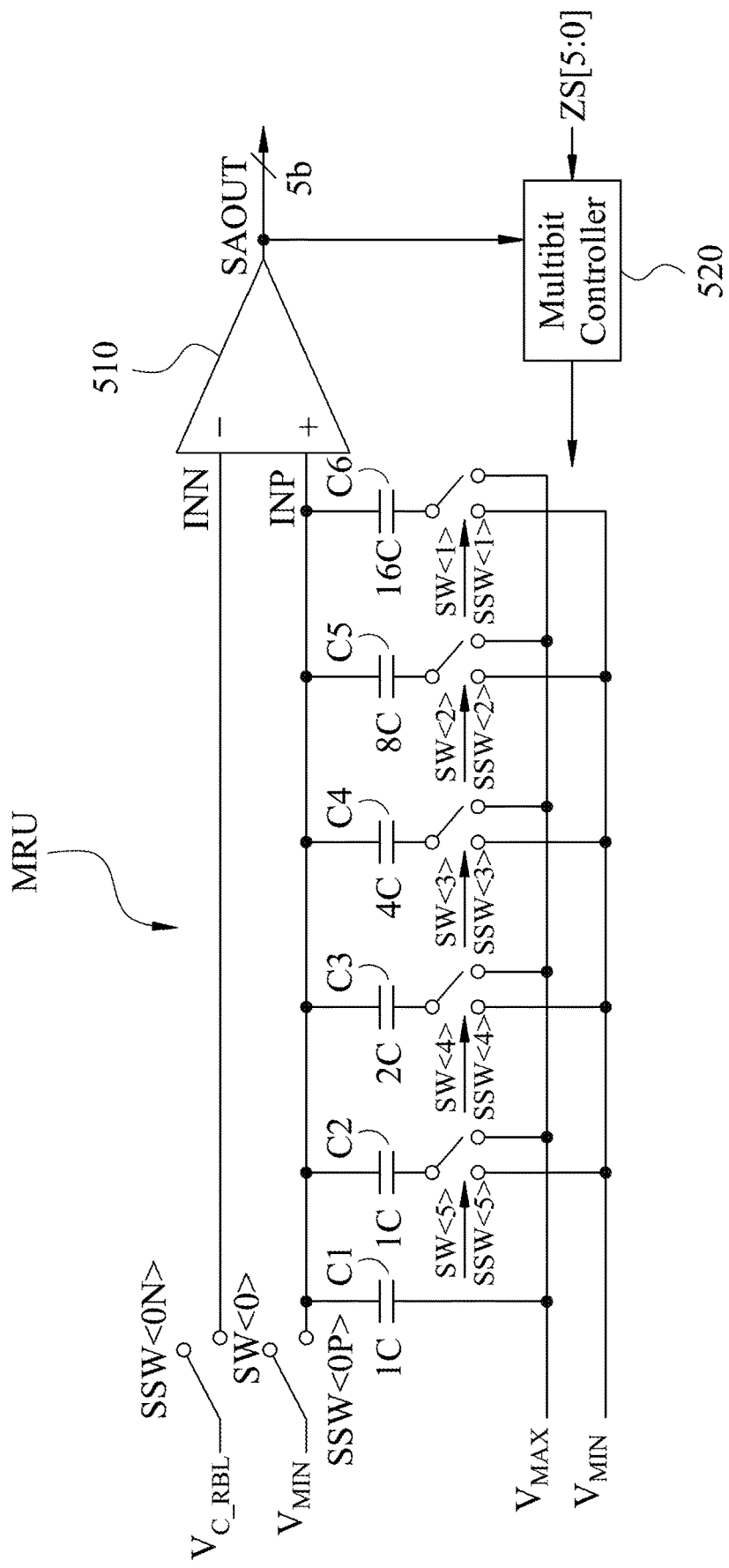
FIG. 7 shows a circuit diagram of an analog-to-digital converter (ADC) of the memory structure of FIG. 1.

Please refer to FIGS. 1-7. FIG. 1 shows a block diagram of a memory structure 100 with input-aware maximum multiply-and-accumulate (MAC) value zone prediction (IA-MaxMACV-ZP) for computing-in-memory (CIM) applications according to one embodiment of the present disclosure. FIG. 2 shows a circuit diagram of a memory array 200 of the memory structure 100 of FIG. 1. FIG. 3 shows a block diagram of an input-aware maximum partial multiply-and-accumulate value voltage generator (IA-MaxPMACV-VG) 410 and a prediction-aware global reference voltage generator (PA-GRVG) 420 of an input-aware zone prediction circuit 400 of the memory structure 100 of FIG. 1. FIG. 4 shows a block diagram of a maximum partial multiply-and-accumulate value zone detector (MaxPMACV-ZD) 430 of the input-aware zone prediction circuit 400 of the memory structure 100 of FIG. 1. FIG. 5 shows a schematic view of a plurality of zones Zone-A, Zone-B, Zone-C, Zone-D between a maximum reference voltage $V_{MAX}$ and a minimum reference voltage $V_{MAC31}$. FIG. 6 shows a circuit diagram of a prediction-aware bitline header selector (PA-BLHS) 442 of a bit line header 440 (Forward BL Header) of the input-aware zone prediction circuit 400 of the memory structure 100 of FIG. 1. FIG. 7 shows a circuit diagram of an analog-to-digital converter (ADC) 500 of the memory structure 100 of FIG. 1. The memory structure 100 with input-aware maximum MAC value zone prediction for CIM applications includes the memory array 200, a word line driver 300, the input-aware zone prediction circuit 400 and the analog-to-digital converter 500.

The memory array 200 includes a plurality of memory units 210 and an output bit line C_RBL<m>. Each of the memory units 210 stores a weight (1-bit weight). Each of the memory units 210 includes a plurality of memory cells 212 and the transpose cell 214. In one embodiment, the number of the memory cells 212 may be 16× (e.g., 16, 32, and so on).

Each of the memory cells 212 is controlled by a first word line WL. In detail, the memory cell 212 includes a first node Q, a second node QB, a local bit line LBL, a local bit line bar LBLB, a first memory cell transistor T1, a second memory cell transistor T2, a first inverter INV1 and a second inverter INV2. The first node Q stores the weight. The second node QB stores an inverted weight opposite to the weight of the first node Q. The local bit line LBL is connected to the transpose cell 214 and transmits the weight from the memory cell 212 to the transpose cell 214. The local bit line bar LBLB is connected to the transpose cell 214 and transmits the inverted weight from the memory cell 212 to the transpose cell 214. The first memory cell transistor T1 is connected to the first node Q, the local bit line LBL and the first word line WL. The second memory cell transistor T2 is connected to the second node QB, the local bit line bar LBLB and the first word line WL. The first inverter INV1 is located between the first node Q and the second node QB. The first inverter INV1 includes a third memory cell transistor T3 and a fourth memory cell transistor T4 connected to the third memory cell transistor T3. The second inverter INV2 is connected to the first inverter INV1. The second inverter INV2 includes a fifth memory cell transistor T5 and a sixth memory cell transistor T6 connected to the fifth memory cell transistor T5. In other words, the memory cell 212 is a 6T static random access memory (SRAM) cell. Each of the first memory cell transistor T1, the second memory cell transistor T2, the third memory cell transistor T3 and the fifth memory cell transistor T5 is the NMOS transistor. Each of the fourth memory cell transistor T4 and the sixth memory cell transistor T6 is the PMOS transistor.

The transpose cell 214 is connected to the memory cell 212 and receives the weight via the local bit line LBL. The transpose cell 214 includes an input bit line GBL<m>, two first input word lines C_RWL_MSB<n>, C_RWL_LSB<n>, a first output bit line C_RBL<m>, two second input word lines R_RWL_MSB<m>, R_RWL_LSB<m> and a second output bit line R_RBL<n>. "m" and "n" represent an mth column and an nth row, respectively. Each of "m" and "n" is an integer which is greater than or equal to 0. The two first input word lines C_RWL_MSB<n>, C_RWL_LSB<n> or the two second input word lines R_RWL_MSB<m>, R_RWL_LSB<m> transmit two input values, respectively. In a forward propagation, the two first input word lines C_RWL_MSB<n>, C_RWL_LSB<n> transmit two input values FWLM<n>, FWLL<n>, respectively. The transpose cell 214 is controlled by a second word line HWL to generate a multiply-accumulate output value on one of the first output bit line C_RBL<m> and the second output bit line R_RBL<n> according to the two input values multiplied by the weight. Each of the two input values is a digital signal. The two first input word lines C_RWL_MSB<n>, C_RWL_LSB<n> and the second output bit line R_RBL<n> are extended in a horizontal direction, and the first output bit line C_RBL<m> and the two second input word lines R_RWL_MSB<m>, R_RWL_LSB<m> are extended in a vertical direction.

The transpose cell 214 includes a first transpose cell transistor M1, a second transpose cell transistor M2, a third transpose cell transistor M3, a fourth transpose cell transistor M4, a fifth transpose cell transistor M5, a sixth transpose cell transistor M6, a seventh transpose cell transistor M7 and an eighth transpose cell transistor M8. The first transpose cell transistor M1 is connected to the second word line HWL, the input bit line GBL<m> and the local bit line LBL. The second transpose cell transistor M2 is connected to the second word line HWL, the first output bit line C_RBL<m> and the local bit line bar LBLB. The third transpose cell transistor M3 is connected to the first input word line C_RWL_MSB<n>, the first output bit line C_RBL<m> and a third node. The fourth transpose cell transistor M4 is connected to the second input word line R_RWL_MSB<m>, the first output bit line C_RBL<m> and the third node. The fifth transpose cell transistor M5 is connected to the local bit line LBL, the second output bit line R_RBL<n> and the third node. The sixth transpose cell transistor M6 is connected to the local bit line LBL, the second output bit line R_RBL<n> and a fourth node. The seventh transpose cell transistor M7 is connected to the first input word line C_RWL_LSB<n>, the first output bit line C_RBL<m> and the fourth node. The eighth transpose cell transistor M8 is connected to the second input word line R_RWL_LSB<m>, the first output bit line C_RBL<m> and the fourth node. Each of the third transpose cell transistor M3, the fourth transpose cell transistor M4 and the fifth transpose cell transistor M5 has a first transistor width. Each of the sixth transpose cell transistor M6, the seventh transpose cell transistor M7, the eighth transpose cell transistor M8 has a second transistor width, and the first transistor width is equal to twice the second transistor width.

The word line driver 300 is connected to each of the memory units 210 via the first word line WL and the second word line HWL. The word line driver 300 is represented as "WL Driver" and is located on a left side of the memory array 200. The word line driver 300 generates the voltage level of the first word line WL and the voltage level of the second word line HWL to control each of the memory units 210.

The input-aware zone prediction circuit 400 is configured to perform input-aware maximum MAC value zone prediction (IA-MaxMACV-ZP). The input-aware zone prediction circuit 400 is connected to the memory array 200 and includes the IA-MaxPMACV-VG 410, the PA-GRVG 420, the MaxPMACV-ZD 430 and the bit line header 440 (Forward BL Header).

The IA-MaxPMACV-VG 410 is configured to generate a maximum partial multiply-and-accumulate value $V_{MAX\text{-}PMACV}$ according to at least one input value (FWLM<0>, FWLL<0>). In detail, the IA-MaxPMACV-VG 410 includes a plurality of bitwise product units (BWPUs) 210r connected in sequence. Each of the BWPUs 210r includes a plurality of replica memory cells 212r and a replica transpose cell 214r (two-way transpose multiply cell, TWT-MC). Each of the replica memory cells 212r stores a replica weight and includes a local bit line LBL transmitting the replica weight. The replica transpose cell 214r is connected to the replica memory cells and receives the replica weight via the local bit line LBL. The replica transpose cell includes an input bit line GBL<m>, at least one first input word line (e.g., C_RWL_MSB<n> and C_RWL_LSB<n>), a first output bit line C_RBL<m>, at least one second input word line (e.g., R_RWL_MSB<m> and R_RWL_LSB<m>) and a second output bit line R_RBL<n>. The structure of the replica memory cells 212r and the replica transpose cell 214r of each of the BWPUs 210r is the same as the structure of the memory cells 212 and the transpose cell 214 of each of the memory units 210 of FIG. 2, and will not be described again herein. The replica weight of each of the replica memory cells 212r is set to 1, i.e., $W_0$-$W_{15}$=1. The at least one first input word line (e.g., C_RWL_MSB<n> and C_RWL_LSB<n>) transmits at least one input value (e.g., FWLM<0> and FWLL<0>), and the replica transpose cell 214r is configured to generate the maximum partial multiply-and-accumulate value $V_{MAX\text{-}PMACV}$ on the first output bit line C_RBL<m> according to the at least one input value (e.g., FWLM<0> and FWLL<0>) multiplied by the replica weight.

The PA-GRVG 420 is configured to generate a plurality of global reference voltages, a maximum reference voltage $V_{MAX}$ and a selected minimum reference voltage $V_{MIN}$. In detail, the global reference voltages include a first global reference voltage $V_{R1/2}$, a second global reference voltage $V_{R1/4}$ and a third global reference voltage $V_{R1/8}$. The PA-GRVG 420 includes a plurality of bitwise product units (BWPUs) 210r. The structure of each of the BWPUs 210r of the PA-GRVG 420 is the same as the structure of each of the BWPUs 210r of the IA-MaxPMACV-VG 410. The BWPUs 210r of the PA-GRVG 420 are divided into a first replica cell bitwise product unit group RC-BWPU-Low, a second replica cell bitwise product unit group RC-BWPU-High, a third replica cell bitwise product unit group RC-BWPU-1/2, a fourth replica cell bitwise product unit group RC-BWPU-1/4 and a fifth replica cell bitwise product unit group RC-BWPU-1/8.

The first replica cell bitwise product unit group RC-BWPU-Low is configured to generate the maximum reference voltage $V_{MAX}$. The first replica cell bitwise product unit group RC-BWPU-Low includes sixteen (e.g., $1^{st}$-$16^{th}$) of the BWPUs 210r connected in sequence. The replica weight of each of the sixteen of the BWPUs 210r is set to 0, i.e., $W_0$-$W_{15}$=0. The at least one first input word line (e.g., C_RWL_MSB<n> and C_RWL_LSB<n>) transmits at least one high input value (e.g., FWLM<0>=1 and FWLL<0>=1). The at least one high input value is set to 1. The replica transpose cell 214r of each of the sixteen of the BWPUs 210r is configured to generate the maximum reference voltage $V_{MAX}$ on the first output bit line C_RBL<m> according to the at least one high input value multiplied by the replica weight.

The second replica cell bitwise product unit group RC-BWPU-High is configured to generate the minimum reference voltage $V_{MAC31}$. The second replica cell bitwise product unit group RC-BWPU-High includes sixteen (e.g., $17^{th}$-$32^{nd}$) of the BWPUs 210r connected in sequence. The replica weight of each of the sixteen of the BWPUs 210r is set to 1. The at least one first input word line (e.g., C_RWL_MSB<n> and C_RWL_LSB<n>) transmits at least one high input value (e.g., FWLM<0>=1 and FWLL<0>=1). The at least one high input value is set to 1. The replica transpose cell 214r of each of the sixteen of the BWPUs 210r is configured to generate the minimum reference voltage $V_{MAC31}$ on the first output bit line C_RBL<m> according to the at least one high input value multiplied by the replica weight. The minimum reference voltage $V_{MAC31}$ is smaller than the first global reference voltage $V_{R1/2}$.

The third replica cell bitwise product unit group RC-BWPU-1/2 is configured to generate the first global reference voltage $V_{R1/2}$. The third replica cell bitwise product unit group RC-BWPU-1/2 includes sixteen (e.g., $33^{rd}$-$48^{th}$) of the BWPUs 210r connected in sequence. The replica weight of each of eight of the sixteen of the BWPUs 210r is set to 1. The replica weight of each of another eight of the sixteen of the BWPUs 210r is set to 0. The at least one first input word line (e.g., C_RWL_MSB<n> and C_RWL_LSB<n>) transmits at least one high input value (e.g., FWLM<0>=1 and FWLL<0>=1). The at least one high input value is set to 1. The replica transpose cell of each of the sixteen of the BWPUs 210r is configured to generate the first global reference voltage $V_{R1/2}$ on the first output bit line C_RBL<m> according to the at least one high input value multiplied by the replica weight. The first global reference voltage $V_{R1/2}$ is smaller than the second global reference voltage $V_{R1/4}$.

The fourth replica cell bitwise product unit group RC-BWPU-1/4 is configured to generate the second global reference voltage $V_{R1/4}$. The fourth replica cell bitwise product unit group RC-BWPU-1/4 includes sixteen (e.g., $49^{th}$-$64^{th}$) of the BWPUs 210r connected in sequence. The replica weight of each of four of the sixteen of the BWPUs 210r is set to 1. The replica weight of each of twelve of the sixteen of the BWPUs 210r is set to 0. The at least one first input word line (e.g., C_RWL_MSB<n> and C_RWL_LSB<n>) transmits at least one high input value (e.g., FWLM<0>=1 and FWLL<0>=1). The at least one high input value is set to 1. The replica transpose cell of each of the sixteen of the BWPUs 210r is configured to generate the second global reference voltage $V_{R1/4}$ on the first output bit line C_RBL<m> according to the at least one high input value multiplied by the replica weight. The second global reference voltage $V_{R1/4}$ is smaller than the third global reference voltage $V_{R1/8}$.

The fifth replica cell bitwise product unit group RC-BWPU-1/8 is configured to generate the third global reference voltage $V_{R1/8}$. The fifth replica cell bitwise product unit group RC-BWPU-1/8 includes sixteen (e.g., $65^{th}$-$80^{th}$) of the BWPUs 210r connected in sequence. The replica weight of each of two of the sixteen of the BWPUs 210r is set to 1. The replica weight of each of fourteen of the sixteen of the BWPUs 210r is set to 0. The at least one first input word line (e.g., C_RWL_MSB<n> and C_RWL_LSB<n>) transmits at least one high input value (e.g., FWLM<0>=1 and FWLL<0>=1). The at least one high input value is set to 1. The replica transpose cell of each of the sixteen of the BWPUs 210r is configured to generate the third global reference voltage $V_{R1/8}$ on the first output bit line C_RBL<m> according to the at least one high input value multiplied by the replica weight. The third global reference voltage $V_{R1/8}$ is smaller than the maximum reference voltage $V_{MAX}$.

The PA-GRVG 420 further includes a 4-to-1 multiplexer (4-to-1 MUX) connected to the second replica cell bitwise product unit group RC-BWPU-High, the third replica cell bitwise product unit group RC-BWPU-1/2, the fourth replica cell bitwise product unit group RC-BWPU-1/4, the fifth replica cell bitwise product unit group RC-BWPU-1/8 and the MaxPMACV-ZD 430. The 4-to-1 multiplexer is configured to select one of the minimum reference voltage $V_{MAC31}$, the first global reference voltage $V_{RA/2}$, the second global reference voltage $V_{R1/4}$ and the third global reference voltage $V_{R1/8}$ to generate the selected minimum reference voltage $V_{MIN}$ according to a zone switch signal ZS[5:0] of the MaxPMACV-ZD 430. The selected minimum reference voltage $V_{MIN}$ is equal to one of the minimum reference voltage $V_{MAC31}$, the first global reference voltage $V_{R1/2}$, the second global reference voltage $V_{R1/4}$ and the third global reference voltage $V_{R1/8}$.

The MaxPMACV-ZD 430 is connected to the IA-MaxPMACV-VG 410, the PA-GRVG 420 and the bit line header 440. The MaxPMACV-ZD 430 is configured to generate the zone switch signal ZS[5:0] by comparing the maximum partial multiply-and-accumulate value $V_{MAX-PMACV}$ and the global reference voltages (i.e., $V_{R1/2}$, $V_{R1/4}$, $V_{R1/8}$). The MaxPMACV-ZD 430 includes a plurality of comparators CMP[0], CMP[1], CMP[2] and an encoder 432. The comparators CMP[0], CMP[1], CMP[2] are connected to the IA-MaxPMACV-VG 410 and the PA-GRVG 420. The comparators CMP[0], CMP[1], CMP[2] generate a plurality of comparison outputs CPOUT[0], CPOUT[1], CPOUT[2], respectively, by comparing the global reference voltages (i.e., $V_{R1/2}$, $V_{R1/4}$, $V_{R1/8}$) with the maximum partial multiply-and-accumulate value $V_{MAX-PMACV}$. The encoder 432 is connected to the comparators CMP[0], CMP[1], CMP[2] and receiving the comparison outputs CPOUT[0], CPOUT[1], CPOUT[2]. The encoder 432 is configured to encode the comparison outputs CPOUT[0], CPOUT[1], CPOUT[2] into the zone switch signal ZS[5:0]. Table 1 lists the zone switch signal ZS[5:0] and the comparison outputs CPOUT[0], CPOUT[1], CPOUT[2] of the MaxPMACV-ZD 430 of FIG. 4. The zone switch signal ZS[5:0] has 6 bits, i.e., ZS[5], ZS[4], ZS[3], ZS[2], ZS[1], ZS[0].

TABLE 1

| CPOUT[2] | CPOUT[1] | CPOUT[0] | ZS[5] | ZS[4] | ZS[3] | ZS[2] | ZS[1] | ZS[0] |
|---|---|---|---|---|---|---|---|---|
| 1 | 1 | 1 | 1 | 1 | 1 | 0 | 0 | 0 |
| 0 | 1 | 1 | 0 | 1 | 1 | 1 | 0 | 0 |
| 0 | 0 | 1 | 0 | 0 | 1 | 1 | 1 | 0 |
| 0 | 0 | 0 | 0 | 0 | 0 | 1 | 1 | 1 |

The bit line header 440 may be a forward bit line header for the forward propagation (in the vertical direction) in FIG. 1. The bit line header 440 is connected to the output bit line C_RBL<m> of the memory array 200 and includes a plurality of prediction-aware bitline header selectors (PA-BLHSs) 442, as shown in FIG. 6. The PA-BLHSs 442 are connected to the encoder 432 and receive the zone switch signal ZS[5:0]. Each of the PA-BLHSs 442 includes a transistor P1, a first resistor R1, a second resistor R2, a third resistor R3, a fourth resistor R4, a first switch SSW[0], a second switch SSW[1], a third switch SSW[2], a fourth switch SSW[3], a fifth switch SSW[4] and a sixth switch SSW[5]. The transistor P1 is the PMOS transistor and controlled by an enable signal EN. The first resistor R1 is connected to the transistor P1. The first switch SSW[0] is connected to the first resistor R1 and controlled by a first bit ZS[0] of the zone switch signal ZS[5:0]. The second switch SSW[1] is connected to the first switch SSW[0] and controlled by a second bit ZS[1] of the zone switch signal ZS[5:0]. The third switch SSW[2] is connected between the second switch SSW[1] and the output bit line C_RBL<m>. The third switch SSW[2] is controlled by a third bit ZS[2] of the zone switch signal ZS[5:0]. The fourth switch SSW[3] is connected to the first resistor R1 and the first switch SSW[0]. The fourth switch SSW[3] is controlled by a fourth bit ZS[3] of the zone switch signal ZS[5:0]. The second resistor R2 is connected to the fourth switch SSW[3], the first switch SSW[0] and the second switch SSW[1]. The fifth switch SSW[4] is connected to the second resistor R2, the first switch SSW[0] and the second switch SSW[1]. The fifth switch SSW[4] is controlled by a fifth bit ZS[4] of the zone switch signal ZS[5:0]. The third resistor R3 is connected to the fifth switch SSW[4], the second switch SSW[1] and the third switch SSW[2]. The sixth switch SSW[5] is connected to the third resistor R3, the second switch SSW[1] and the third switch SSW[2]. The sixth switch SSW[5] is controlled by a sixth bit ZS[5] of the zone switch signal ZS[5:0]. The fourth resistor R4 is connected to the sixth switch SSW[5], the third switch SSW[2] and the output bit line C_RBL<m>. The fourth resistor R4 is connected between the sixth switch SSW[5] and the output bit line C_RBL<m>. The first resistor R1 has the same resistance as each of the second resistor R2, the third resistor R3 and the fourth resistor R4.

Table 2 lists configurable resistances between the power supply voltage $V_{DD}$ and the output bit line C_RBL<m> in the PA-BLH 442 of FIG. 6, associated with the zone switch signal ZS[5:0]. When the zone switch signal ZS[5:0] is equal to "000111" (i.e., ZS[5]=0, ZS[4]=0, ZS[3]=0, ZS[2]=1, ZS[1]=1, ZS[0]=1), the configurable resistance of the PA-BLH 442 is equal to R (i.e., R=R1). When the zone switch signal ZS[5:0] is equal to "001110" (i.e., ZS[5]=0, ZS[4]=0, ZS[3]=1, ZS[2]=1, ZS[1]=1, ZS[0]=0), the configurable resistance of the PA-BLH 442 is equal to 2R (i.e., 2R=R1+R2). When the zone switch signal ZS[5:0] is equal to "011100" (i.e., ZS[5]=0, ZS[4]=1, ZS[3]=1, ZS[2]=1, ZS[1]=0, ZS[0]=0), the configurable resistance of the PA-BLH 442 is equal to 3R (i.e., 3R=R1+R2+R3). When the zone switch signal ZS[5:0] is equal to "111000" (i.e., ZS[5]=1, ZS[4]=1, ZS[3]=1, ZS[2]=0, ZS[1]=0, ZS[0]=0), the configurable resistance of the PA-BLH 442 is equal to 4R (i.e., 4R=R1+R2+R3+R4). There are four zones Zone-A, Zone-B, Zone-C, Zone-D between the maximum reference voltage $V_{MAX}$ and the minimum reference voltage $V_{MAC31}$. The maximum reference voltage $V_{MAX}$ is corresponding to a minimum partial multiply-and-accumulate value (e.g., $PMAC_{2bIN-1bw-16A}$=0), and the minimum reference voltage $V_{MAC31}$ is corresponding to a maximum partial multiply-and-accumulate value (e.g., $PMAC_{2bIN-1bw-16A}$=31). The zone Zone-A is located between the minimum reference voltage $V_{MAC31}$ and the first global reference voltage $V_{R1/2}$. The zone Zone-B is located between the first global reference voltage $V_{R1/2}$ and the second global reference voltage $V_{R1/4}$. The zone Zone-C is located between the second global reference voltage $V_{R1/4}$ and the third global reference voltage $V_{R1/8}$. The zone Zone-D is located between the third global reference voltage $V_{R1/8}$ and the maximum reference voltage $V_{MAX}$.

TABLE 2

| ZS[5] | ZS[4] | ZS[3] | ZS[2] | ZS[1] | ZS[0] | Header (Res.) | Zone |
|---|---|---|---|---|---|---|---|
| 1 | 1 | 1 | 0 | 0 | 0 | 4R | Zone-D |
| 0 | 1 | 1 | 1 | 0 | 0 | 3R | Zone-C |
| 0 | 0 | 1 | 1 | 1 | 0 | 2R | Zone-B |
| 0 | 0 | 0 | 1 | 1 | 1 | R (Default) | Zone-A |

The analog-to-digital converter 500 is connected to the memory array 200 and the PA-GRVG 420. In detail, the analog-to-digital converter 500 may be a successive-approximation-register analog-to-digital converter (SAR ADC). The analog-to-digital converter 500 includes a plurality of multibit readout units (MRUs). Each of the MRUs includes a first input node INN, a second input node INP, a plurality of capacitors C1, C2, C3, C4, C5, C6, a plurality of MRU switches SSW<0N>, SSW<0P>, SSW<1>, SSW<2>, SSW<3>, SSW<4>, SSW<5>, a sense amplifier 510 and a multibit controller 520, as shown in FIG. 7.

The switch SSW<0N> is connected between the first input node INN and the output bit line C_RBL<m> having a column-read-bitline voltage level $V_{C\_RBL}$. The switch SSW<0P> is connected between the second input node INP and a first reference node having the selected minimum reference voltage $V_{MIN}$. The capacitor C1 is connected between the second input node INP and a second reference node having the maximum reference voltage $V_{MAX}$. The capacitor C2 is connected between the second input node INP and the MRU switch SSW<5>. The capacitor C3 is connected between the second input node INP and the MRU switch SSW<4>. The capacitor C4 is connected between the second input node INP and the MRU switch SSW<3>. The capacitor C5 is connected between the second input node INP and the MRU switch SSW<2>. The capacitor C6 is connected between the second input node INP and the MRU switch SSW<1>. The switch SSW<1> is connected between the capacitor C6 and one of the first reference node and the second reference node. The switch SSW<2> is connected between the capacitor C5 and one of the first reference node and the second reference node. The switch SSW<3> is connected between the capacitor C4 and one of the first reference node and the second reference node. The switch SSW<4> is connected between the capacitor C3 and one of the first reference node and the second reference node. The switch SSW<5> is connected between the capacitor C2 and one of the first reference node and the second reference node. The capacitors C1, C2, C3, C4, C5, C6 have capacitances of 1 C, 1 C, 2 C, 4 C 8 C, 16 C, respectively. The switch SSW<0N> and the switch SSW<0P> are controlled by a switch signal SW<0>. The switch SSW<1> is controlled by a switch signal SW<1>. The switch SSW<2> is controlled by a switch signal SW<2>. The switch SSW<3> is controlled by a switch signal SW<3>. The switch SSW<4> is controlled by a switch signal SW<4>. The switch SSW<5> is controlled by a switch signal SW<5>.

The sense amplifier 510 may be a small-offset gain-enhancement sense amplifier (SOGE-SA). The sense amplifier 510 is configured to compare a voltage level of the first input node INN and a voltage level of the second input node INP to generate a sensing output SAOUT. The multibit controller 520 is electrically connected to the sense amplifier 510, the MRU switches SSW<0N>, SSW<0P>, SSW<1>, SSW<2>, SSW<3>, SSW<4>, SSW<5> and the encoder 432. The multibit controller 520 is configured to generate the switch signals SW<0>, SW<1>, SW<2>, SW<3>, SW<4>, SW<5> according to the sensing output SAOUT and the zone switch signal ZS[5:0]. The memory array 200 is configured to generate an analog multiply-and-accumulate output value on the output bit line C_RBL<m> according to the at least one input value (e.g., FWLM<0> and FWLL<0>) multiplied by the weight. The analog-to-digital converter 500 is configured to convert the analog multiply-and-accumulate output value (i.e., the column-read-bitline voltage level $V_{C\_RBL}$) to a digital multiply-and-accumulate output value (i.e., the sensing output SAOUT) according to the maximum reference voltage $V_{MAX}$, the selected minimum reference voltage $V_{MIN}$ and the zone switch signal ZS[5:0].

In the SOGE-SA, repeating the SOGE-SA operation through the 5 phases using 5 different reference voltages allows a single SOGE-SA to generate 5b-quantization partial multiply-and-accumulate value (PMACV). The memory structure 100 with input-aware maximum MAC value zone prediction for CIM applications of the present disclosure can reduce the number of toggle phases and output bits of the analog-to-digital converter 500. Therefore, the memory structure 100 with input-aware maximum MAC value zone prediction for CIM applications of the present disclosure utilizes the IA-MaxPMACV-VG 410, the PA-GRVG 420 and the MaxPMACV-ZD 430 of the input-aware zone prediction circuit 400 to implement input-aware maximum MAC value zone prediction so as to reduce the power consumption and adjust the number of toggle phases and output bits of the analog-to-digital converter 500. Moreover, the memory structure 100 with input-aware maximum MAC value zone prediction for CIM applications of the present disclosure utilizes the PA-BLHS 442 of the bit line header 440 to select the configurable resistance to enhance sensing margin and have higher sensing accuracy, so that the accumulation result (the analog multiply-and-accumulate output value) can be easily sensed by the analog-to-digital converter 500, and the performance of CIM macro (the memory array 200) can be greatly improved.

Figure 8:
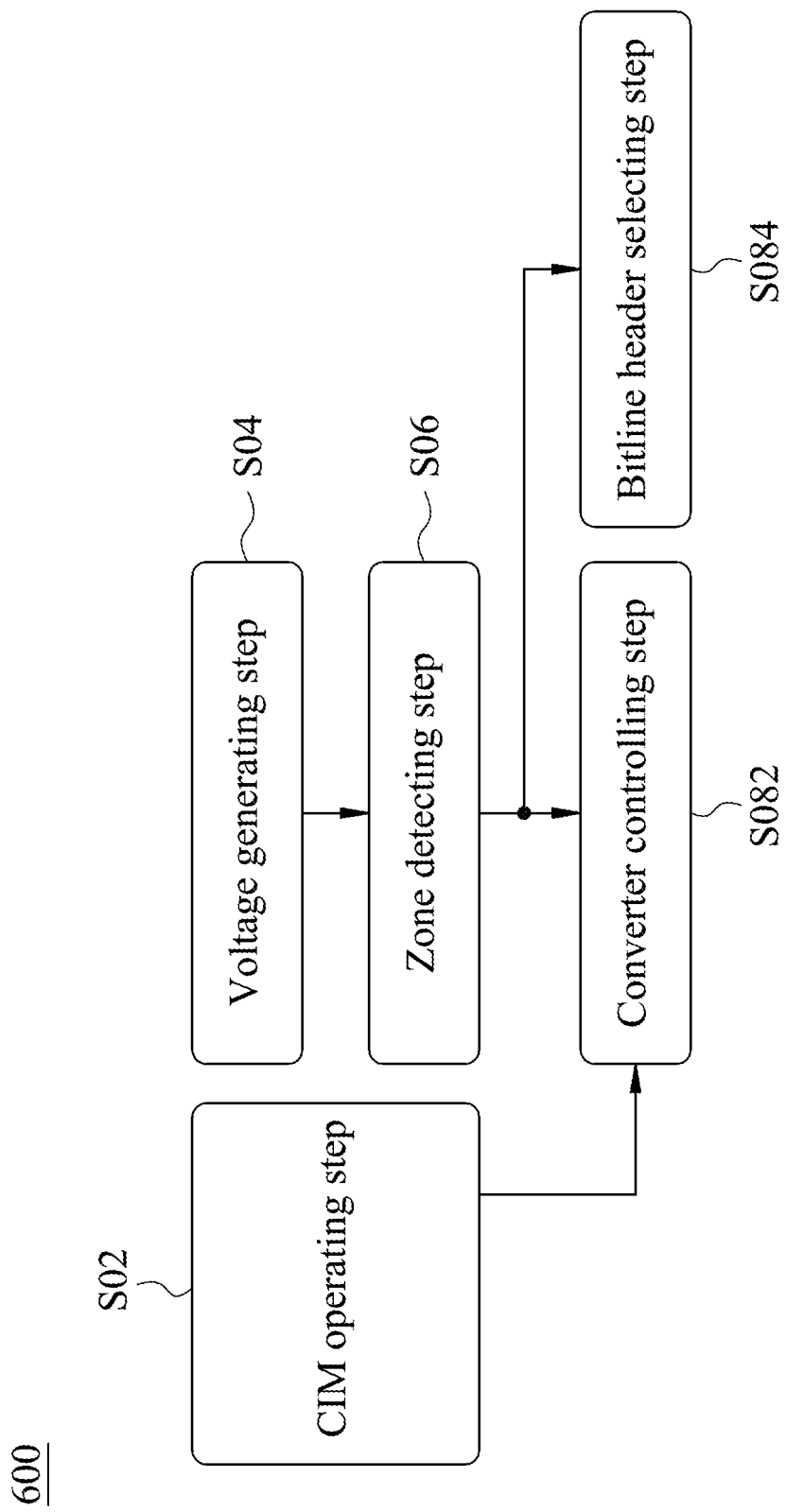
FIG. 8 shows a flow chart of an operating method of a memory structure with input-aware maximum multiply-and-accumulate value zone prediction for computing-in-memory applications according to another embodiment of the present disclosure.
Figure 9:
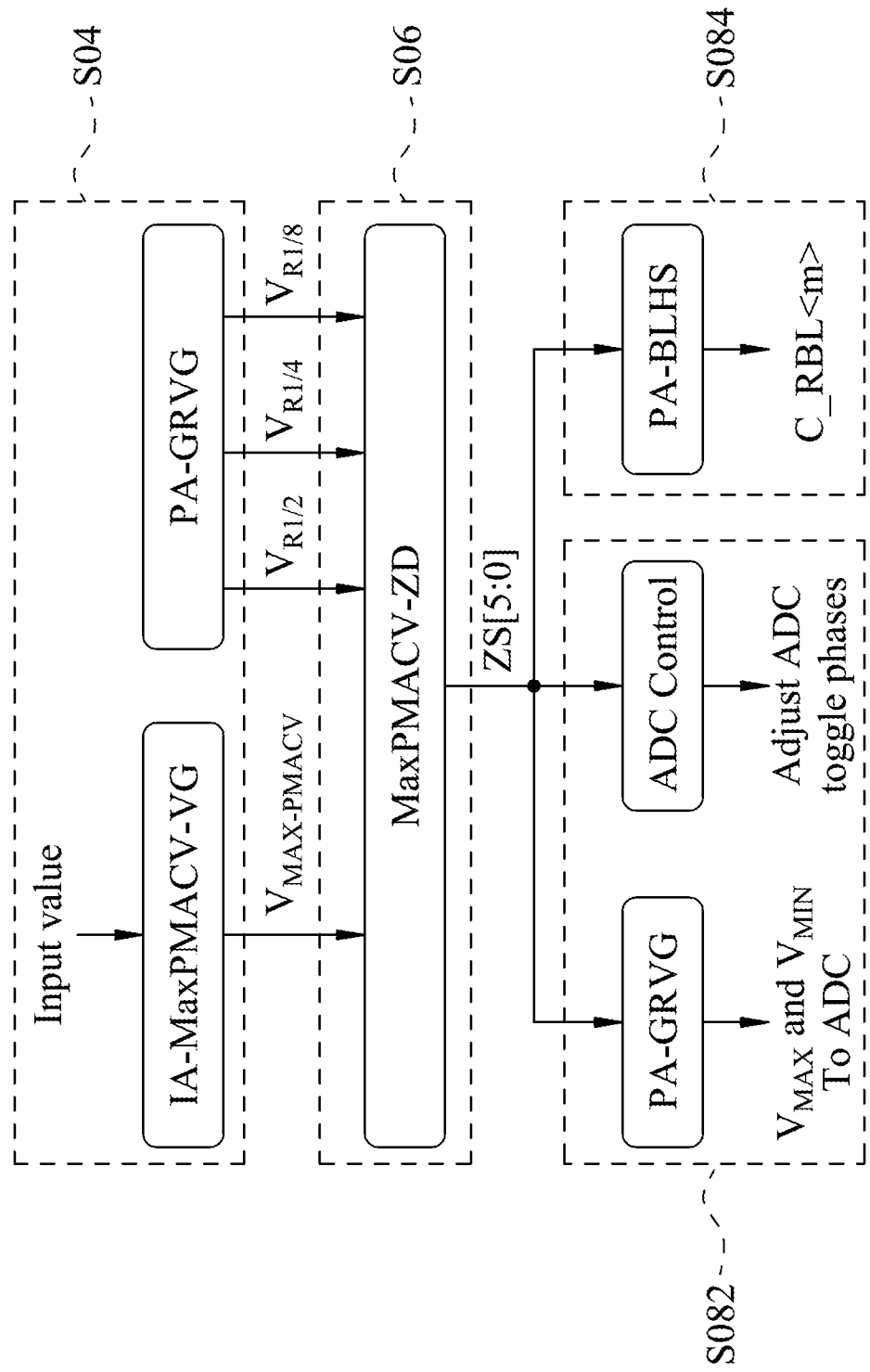
FIG. 9 shows a schematic view of a voltage generating step, a zone detecting step, a converter controlling step and a bitline header selecting step of FIG. 8.

Please refer to FIGS. 1-9. FIG. 8 shows a flow chart of an operating method 600 of a memory structure 100 with input-aware maximum MAC value zone prediction for CIM applications according to another embodiment of the present disclosure. FIG. 9 shows a schematic view of a voltage generating step S04, a zone detecting step S06, a converter controlling step S082 and a bitline header selecting step S084 of FIG. 8. The operating method 600 of the memory structure 100 with input-aware maximum MAC value zone prediction for CIM applications includes performing a CIM operating step S02, the voltage generating step S04, the zone detecting step S06, the converter controlling step S082 and the bitline header selecting step S084.

The CIM operating step S02 includes driving the memory array 200 of the memory structure 100 to generate an analog multiply-and-accumulate output value on the output bit line C_RBL<m> according to at least one input value (e.g., FWLM<0> and FWLL<0>) multiplied by the weight.

The voltage generating step S04 includes driving an IA-MaxPMACV-VG 410 of the memory structure 100 to generate a maximum partial multiply-and-accumulate value $V_{MAX\text{-}PMACV}$ according to the at least one input value, and driving a PA-GRVG 420 of the memory structure 100 to generate a plurality of global reference voltages (i.e., $V_{R1/2}$, $V_{R1/4}$, $V_{R1/8}$), a maximum reference voltage $V_{MAX}$ and a selected minimum reference voltage $V_{MIN}$.

The zone detecting step S06 includes driving a MaxP-MACV-ZD 430 of the memory structure 100 to generate a zone switch signal ZS[5:0] by comparing the maximum partial multiply-and-accumulate value $V_{MAX\text{-}PMACV}$ and the global reference voltages (i.e., $V_{R1/2}$, $V_{R1/4}$, $V_{R1/8}$).

The converter controlling step S082 includes driving an analog-to-digital converter 500 of the memory structure 100 to convert the analog multiply-and-accumulate output value to a digital multiply-and-accumulate output value according to the maximum reference voltage $V_{MAX}$, the selected minimum reference voltage $V_{MIN}$ and the zone switch signal ZS[5:0].

The bitline header selecting step S084 includes driving at least one PA-BLHS 442 of a bit line header 440 of the memory structure 100 to select a configurable resistance according to the zone switch signal ZS[5:0].

Therefore, the operating method 600 of the memory structure 100 with input-aware maximum MAC value zone prediction for CIM applications of the present disclosure utilizes the IA-MaxPMACV-VG 410, the PA-GRVG 420 and the MaxPMACV-ZD 430 of the input-aware zone prediction circuit 400 to implement input-aware maximum MAC value zone prediction so as to reduce the power consumption and adjust the number of toggle phases and output bits of the analog-to-digital converter 500. In addition, the operating method 600 of the memory structure 100 with input-aware maximum MAC value zone prediction for CIM applications of the present disclosure utilizes the PA-BLHS 442 of the bit line header 440 to select the configurable resistance to enhance sensing margin and have higher sensing accuracy, so that the accumulation result (the analog multiply-and-accumulate output value) can be easily sensed by the analog-to-digital converter 500, and the performance of CIM macro (the memory array 200) can be improved.

In a backward propagation (in a horizontal direction), another IA-MaxPMACV-VG, another PA-GRVG, another bit line header (Backward BL Header), the MaxPMACV-ZD 430 and another analog-to-digital converter can be configured to implement a backward operation. The MaxPMACV-ZD 430 can be shared to generate the zone switch signal ZS[5:0]. The structure of the another IA-MaxPMACV-VG, the another PA-GRVG, the another bit line header and the another analog-to-digital converter is similar to the structure of the IA-MaxPMACV-VG 410, the PA-GRVG 420, the bit line header 440 and the analog-to-digital converter 500, and will not be described again herein.

According to the aforementioned embodiments and examples, the advantages of the present disclosure are described as follows.

1. The memory structure with input-aware maximum MAC value zone prediction for CIM applications and the operating method thereof of the present disclosure utilize the IA-MaxPMACV-VG, the PA-GRVG and the MaxPMACV-ZD of the input-aware zone prediction circuit to implement input-aware maximum MAC value zone prediction so as to reduce the power consumption and adjust the number of toggle phases and output bits of the analog-to-digital converter.

2. The memory structure with input-aware maximum MAC value zone prediction for CIM applications and the operating method thereof of the present disclosure utilize the PA-BLHS of the bit line header to select the configurable resistance to enhance sensing margin and have higher sensing accuracy, so that the accumulation result can be easily sensed by the analog-to-digital converter, and the performance of CIM macro can be improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A memory structure with input-aware maximum multiply-and-accumulate value zone prediction for computing-in-memory applications comprising:
    a memory array comprising a plurality of memory units and an output bit line, wherein each of the memory units stores a weight;
    an input-aware zone prediction circuit connected to the memory array and comprising:
        an input-aware maximum partial multiply-and-accumulate value voltage generator configured to generate a maximum partial multiply-and-accumulate value according to at least one input value;
        a prediction-aware global reference voltage generator configured to generate a plurality of global reference voltages, a maximum reference voltage and a selected minimum reference voltage; and
        a maximum partial multiply-and-accumulate value zone detector connected to the input-aware maximum partial multiply-and-accumulate value voltage generator and the prediction-aware global reference voltage generator, wherein the maximum partial multiply-and-accumulate value zone detector is configured to generate a zone switch signal by comparing the maximum partial multiply-and-accumulate value and the global reference voltages; and
    an analog-to-digital converter connected to the memory array and the prediction-aware global reference voltage generator;
    wherein the memory array is configured to generate an analog multiply-and-accumulate output value on the output bit line according to the at least one input value multiplied by the weight, and the analog-to-digital converter is configured to convert the analog multiply-and-accumulate output value to a digital multiply-and-accumulate output value according to the maximum reference voltage, the selected minimum reference voltage and the zone switch signal.

2. The memory structure with input-aware maximum multiply-and-accumulate value zone prediction for computing-in-memory applications of claim 1, wherein the input-aware maximum partial multiply-and-accumulate value voltage generator comprises:
    a plurality of bitwise product units connected in sequence, wherein each of the bitwise product units comprises:
        a replica memory cell storing a replica weight, wherein the replica memory cell comprises a local bit line transmitting the replica weight; and
        a replica transpose cell connected to the replica memory cell and receiving the replica weight via the local bit line, wherein the replica transpose cell comprises an input bit line, at least one first input word line, a first output bit line, at least one second input word line and a second output bit line;
    wherein the replica weight is set to 1, the at least one first input word line transmits at least one input value, and the replica transpose cell is configured to generate the maximum partial multiply-and-accumulate value on the first output bit line according to the at least one input value multiplied by the replica weight.

3. The memory structure with input-aware maximum multiply-and-accumulate value zone prediction for computing-in-memory applications of claim 1, wherein the prediction-aware global reference voltage generator comprises:
    a plurality of bitwise product units, wherein each of the bitwise product units comprises:
        a replica memory cell storing a replica weight, wherein the replica memory cell comprises a local bit line transmitting the replica weight; and
        a replica transpose cell connected to the replica memory cell and receiving the replica weight via the local bit line, wherein the replica transpose cell comprises an input bit line, at least one first input word line, a first output bit line, at least one second input word line and a second output bit line.

4. The memory structure with input-aware maximum multiply-and-accumulate value zone prediction for computing-in-memory applications of claim 3, wherein the global reference voltages comprise a first global reference voltage, a second global reference voltage and a third global reference voltage;
    the bitwise product units of the prediction-aware global reference voltage generator are divided into a first replica cell bitwise product unit group, a second replica cell bitwise product unit group, a third replica cell bitwise product unit group, a fourth replica cell bitwise product unit group and a fifth replica cell bitwise product unit group, the first replica cell bitwise product unit group is configured to generate the maximum reference voltage, the second replica cell bitwise product unit group is configured to generate a minimum reference voltage, the third replica cell bitwise product unit group is configured to generate the first global reference voltage, the fourth replica cell bitwise product unit group is configured to generate the second global reference voltage, and the fifth replica cell bitwise product unit group is configured to generate the third global reference voltage; and
    the minimum reference voltage is smaller than the first global reference voltage, the first global reference voltage is smaller than the second global reference voltage, the second global reference voltage is smaller than the third global reference voltage, and the third global reference voltage is smaller than the maximum reference voltage.

5. The memory structure with input-aware maximum multiply-and-accumulate value zone prediction for computing-in-memory applications of claim 4, wherein the first replica cell bitwise product unit group comprises sixteen of the bitwise product units connected in sequence, the replica weight of each of the sixteen of the bitwise product units is set to 0, the at least one first input word line transmits at least one high input value, the at least one high input value is set to 1, and the replica transpose cell of each of the sixteen of the bitwise product units is configured to generate the maximum reference voltage on the first output bit line according to the at least one high input value multiplied by the replica weight.

6. The memory structure with input-aware maximum multiply-and-accumulate value zone prediction for computing-in-memory applications of claim 4, wherein the second replica cell bitwise product unit group comprises sixteen of the bitwise product units connected in sequence, the replica weight of each of the sixteen of the bitwise product units is set to 1, the at least one first input word line transmits at least one high input value, the at least one high input value is set to 1, and the replica transpose cell of each of the sixteen of the bitwise product units is configured to generate the minimum reference voltage on the first output bit line according to the at least one high input value multiplied by the replica weight.

7. The memory structure with input-aware maximum multiply-and-accumulate value zone prediction for computing-in-memory applications of claim 4, wherein the third replica cell bitwise product unit group comprises sixteen of the bitwise product units connected in sequence, the replica weight of each of eight of the sixteen of the bitwise product units is set to 1, the replica weight of each of another eight of the sixteen of the bitwise product units is set to 0, the at least one first input word line transmits at least one high input value, the at least one high input value is set to 1, and the replica transpose cell of each of the sixteen of the bitwise product units is configured to generate the first global reference voltage on the first output bit line according to the at least one high input value multiplied by the replica weight.

8. The memory structure with input-aware maximum multiply-and-accumulate value zone prediction for computing-in-memory applications of claim 4, wherein the fourth replica cell bitwise product unit group comprises sixteen of the bitwise product units connected in sequence, the replica weight of each of four of the sixteen of the bitwise product units is set to 1, the replica weight of each of twelve of the sixteen of the bitwise product units is set to 0, the at least one first input word line transmits at least one high input value, the at least one high input value is set to 1, and the replica transpose cell of each of the sixteen of the bitwise product units is configured to generate the second global reference voltage on the first output bit line according to the at least one high input value multiplied by the replica weight.

9. The memory structure with input-aware maximum multiply-and-accumulate value zone prediction for computing-in-memory applications of claim 4, wherein the fifth replica cell bitwise product unit group comprises sixteen of the bitwise product units connected in sequence, the replica weight of each of two of the sixteen of the bitwise product units is set to 1, the replica weight of each of fourteen of the sixteen of the bitwise product units is set to 0, the at least one first input word line transmits at least one high input value, the at least one high input value is set to 1, and the replica transpose cell of each of the sixteen of the bitwise product units is configured to generate the third global reference voltage on the first output bit line according to the at least one high input value multiplied by the replica weight.

10. The memory structure with input-aware maximum multiply-and-accumulate value zone prediction for computing-in-memory applications of claim 4, wherein the prediction-aware global reference voltage generator further comprises:
a 4-to-1 multiplexer connected to the second replica cell bitwise product unit group, the third replica cell bitwise product unit group, the fourth replica cell bitwise product unit group, the fifth replica cell bitwise product unit group and the maximum partial multiply-and-accumulate value zone detector, wherein the 4-to-1 multiplexer is configured to select one of the minimum reference voltage, the first global reference voltage, the second global reference voltage and the third global reference voltage to generate the selected minimum reference voltage according to the zone switch signal, and the selected minimum reference voltage is equal to one of the minimum reference voltage, the first global reference voltage, the second global reference voltage and the third global reference voltage.

11. The memory structure with input-aware maximum multiply-and-accumulate value zone prediction for computing-in-memory applications of claim 1, wherein the maximum partial multiply-and-accumulate value zone detector comprises:
a plurality of comparators connected to the input-aware maximum partial multiply-and-accumulate value voltage generator and the prediction-aware global reference voltage generator, wherein the comparators generate a plurality of comparison outputs, respectively, by comparing the global reference voltages with the maximum partial multiply-and-accumulate value; and
an encoder connected to the comparators and receiving the comparison outputs, wherein the encoder is configured to encode the comparison outputs into the zone switch signal.

12. The memory structure with input-aware maximum multiply-and-accumulate value zone prediction for computing-in-memory applications of claim 11, wherein the input-aware zone prediction circuit further comprises a bit line header connected to the output bit line of the memory array, and the bit line header comprises:
at least one prediction-aware bitline header selector connected to the encoder and receiving the zone switch signal, wherein the zone switch signal has 6 bits, and the at least one prediction-aware bitline header selector comprises:
a transistor;
a first resistor connected to the transistor;
a first switch connected to the first resistor and controlled by a first bit of the zone switch signal;
a second switch connected to the first switch and controlled by a second bit of the zone switch signal;
a third switch connected between the second switch and the output bit line, wherein the third switch is controlled by a third bit of the zone switch signal;
a fourth switch connected to the first resistor and the first switch, wherein the fourth switch is controlled by a fourth bit of the zone switch signal;
a second resistor connected to the fourth switch, the first switch and the second switch;
a fifth switch connected to the second resistor, the first switch and the second switch, wherein the fifth switch is controlled by a fifth bit of the zone switch signal;
a third resistor connected to the fifth switch, the second switch and the third switch;
a sixth switch connected to the third resistor, the second switch and the third switch, wherein the sixth switch is controlled by a sixth bit of the zone switch signal; and
a fourth resistor connected to the sixth switch, the third switch and the output bit line.

13. The memory structure with input-aware maximum multiply-and-accumulate value zone prediction for computing-in-memory applications of claim 1, wherein the analog-to-digital converter is a successive-approximation-register analog-to-digital converter.

14. An operating method of a memory structure with input-aware maximum multiply-and-accumulate value zone prediction for computing-in-memory applications, comprising:
performing a computing-in-memory operating step, wherein the computing-in-memory operating step comprises driving a memory array of the memory structure to generate an analog multiply-and-accumulate output value on an output bit line according to at least one input value multiplied by a weight;

performing a voltage generating step, wherein the voltage generating step comprises:

driving an input-aware maximum partial multiply-and-accumulate value voltage generator of the memory structure to generate a maximum partial multiply-and-accumulate value according to the at least one input value; and driving a prediction-aware global reference voltage generator of the memory structure to generate a plurality of global reference voltages, a maximum reference voltage and a selected minimum reference voltage;

performing a zone detecting step, wherein the zone detecting step comprises driving a maximum partial multiply-and-accumulate value zone detector of the memory structure to generate a zone switch signal by comparing the maximum partial multiply-and-accumulate value and the global reference voltages; and performing a converter controlling step, wherein the converter controlling step comprises driving an analog-to-digital converter of the memory structure to convert the analog multiply-and-accumulate output value to a digital multiply-and-accumulate output value according to the maximum reference voltage, the selected minimum reference voltage and the zone switch signal.

15. The operating method of the memory structure with input-aware maximum multiply-and-accumulate value zone prediction for computing-in-memory applications of claim 14, further comprising:

performing a bitline header selecting step, wherein the bitline header selecting step comprises driving at least one prediction-aware bitline header selector of a bit line header of the memory structure to select a configurable resistance according to the zone switch signal;

wherein the at least one prediction-aware bitline header selector is connected to the maximum partial multiply-and-accumulate value zone detector and receives the zone switch signal.

16. The operating method of the memory structure with input-aware maximum multiply-and-accumulate value zone prediction for computing-in-memory applications of claim 15, wherein the zone switch signal has 6 bits, and the at least one prediction-aware bitline header selector comprises:

a transistor;
a first resistor connected to the transistor;
a first switch connected to the first resistor and controlled by a first bit of the zone switch signal;
a second switch connected to the first switch and controlled by a second bit of the zone switch signal;
a third switch connected between the second switch and the output bit line, wherein the third switch is controlled by a third bit of the zone switch signal;
a fourth switch connected to the first resistor and the first switch, wherein the fourth switch is controlled by a fourth bit of the zone switch signal;
a second resistor connected to the fourth switch, the first switch and the second switch;
a fifth switch connected to the second resistor, the first switch and the second switch, wherein the fifth switch is controlled by a fifth bit of the zone switch signal;
a third resistor connected to the fifth switch, the second switch and the third switch;

a sixth switch connected to the third resistor, the second switch and the third switch, wherein the sixth switch is controlled by a sixth bit of the zone switch signal; and
a fourth resistor connected to the sixth switch, the third switch and the output bit line.

17. The operating method of the memory structure with input-aware maximum multiply-and-accumulate value zone prediction for computing-in-memory applications of claim 14, wherein the input-aware maximum partial multiply-and-accumulate value voltage generator comprises:

a plurality of bitwise product units connected in sequence, wherein each of the bitwise product units comprises:
a replica memory cell storing a replica weight, wherein the replica memory cell comprises a local bit line transmitting the replica weight; and
a replica transpose cell connected to the replica memory cell and receiving the replica weight via the local bit line, wherein the replica transpose cell comprises an input bit line, at least one first input word line, a first output bit line, at least one second input word line and a second output bit line;

wherein the replica weight is set to 1, the at least one first input word line transmits at least one input value, and the replica transpose cell is configured to generate the maximum partial multiply-and-accumulate value on the first output bit line according to the at least one input value multiplied by the replica weight.

18. The operating method of the memory structure with input-aware maximum multiply-and-accumulate value zone prediction for computing-in-memory applications of claim 14, wherein the prediction-aware global reference voltage generator comprises:

a plurality of bitwise product units, wherein each of the bitwise product units comprises:
a replica memory cell storing a replica weight, wherein the replica memory cell comprises a local bit line transmitting the replica weight; and
a replica transpose cell connected to the replica memory cell and receiving the replica weight via the local bit line, wherein the replica transpose cell comprises an input bit line, at least one first input word line, a first output bit line, at least one second input word line and a second output bit line.

19. The operating method of the memory structure with input-aware maximum multiply-and-accumulate value zone prediction for computing-in-memory applications of claim 18, wherein the global reference voltages comprise a first global reference voltage, a second global reference voltage and a third global reference voltage;

the bitwise product units of the prediction-aware global reference voltage generator are divided into a first replica cell bitwise product unit group, a second replica cell bitwise product unit group, a third replica cell bitwise product unit group, a fourth replica cell bitwise product unit group and a fifth replica cell bitwise product unit group, the first replica cell bitwise product unit group is configured to generate the maximum reference voltage, the second replica cell bitwise product unit group is configured to generate a minimum reference voltage, the third replica cell bitwise product unit group is configured to generate the first global reference voltage, the fourth replica cell bitwise product unit group is configured to generate the second global reference voltage, and the fifth replica cell bitwise product unit group is configured to generate the third global reference voltage; and the minimum reference voltage is smaller than the first global reference voltage, the first global reference voltage is smaller than the second global reference voltage, the second global reference voltage is smaller than the third global reference voltage, the third global reference voltage is smaller than the maximum reference voltage, and the selected minimum reference voltage is equal to one of the minimum reference voltage, the first global reference voltage, the second global reference voltage and the third global reference voltage.

20. The operating method of the memory structure with input-aware maximum multiply-and-accumulate value zone prediction for computing-in-memory applications of claim 14, wherein the maximum partial multiply-and-accumulate value zone detector comprises:

a plurality of comparators connected to the input-aware maximum partial multiply-and-accumulate value voltage generator and the prediction-aware global reference voltage generator, wherein the comparators generate a plurality of comparison outputs, respectively, by comparing the global reference voltages with the maximum partial multiply-and-accumulate value; and an encoder connected to the comparators and receiving the comparison outputs, wherein the encoder is configured to encode the comparison outputs into the zone switch signal.

* * * * *